(12) United States Patent
Tun

(10) Patent No.: US 9,638,884 B2
(45) Date of Patent: May 2, 2017

(54) SELECTIVE COMPONENT BONDING TECHNIQUE

(71) Applicant: STMicroelectronics Pte Ltd., Singapore (SG)

(72) Inventor: Tin Tun, Singapore (SG)

(73) Assignee: STMicroelectronics Pte Ltd, Singapore (SG)

( * ) Notice: Subject to any disclaimer, the term of this patent is extended or adjusted under 35 U.S.C. 154(b) by 173 days.

(21) Appl. No.: 14/322,054

(22) Filed: Jul. 2, 2014

(65) Prior Publication Data

US 2016/0004029 A1 Jan. 7, 2016

(51) Int. Cl.
*G02B 7/02* (2006.01)

(52) U.S. Cl.
CPC ........... *G02B 7/025* (2013.01); *G02B 7/02* (2013.01)

(58) Field of Classification Search
None
See application file for complete search history.

(56) References Cited

U.S. PATENT DOCUMENTS

| 2005/0179805 A1* | 8/2005 | Avron | G02B 7/022 348/340 |
| 2009/0103193 A1* | 4/2009 | Berube | G02B 7/02 359/819 |
| 2011/0316108 A1* | 12/2011 | Nihei | H01L 27/14618 257/435 |

* cited by examiner

*Primary Examiner* — Darryl J Collins
*Assistant Examiner* — Journey Sumlar
(74) *Attorney, Agent, or Firm* — Seed IP Law Group LLP

(57) ABSTRACT

A method of selectively bonding a component to a substrate prevents glue displacement onto neighboring components. The method entails shortening a section of the perimeter of a mount wall so that the foot of the mount wall contacts the glue without causing substantial displacement. A cure step hardens and holds the shortened foot of the mount wall in a stationary position, while providing a partial bond. Meanwhile the rest of the mount wall that is not located near contact pads on the substrate has a tall foot that extends to the surface of the substrate and is bonded in the usual way. By modifying the component, it is not necessary to modify either the chemistry of the epoxy or the epoxy dispense operation.

21 Claims, 4 Drawing Sheets

SELECTIVE COMPONENT BONDING TECHNIQUE

BACKGROUND

Technical Field

The present disclosure generally relates to techniques for mounting a component onto a substrate, and in particular, to bonding a camera lens assembly to a substrate for use in a mobile electronic device.

Description of the Related Art

Attaching components to a substrate inside a microelectronic device such as a camera module for a smart phone becomes more and more difficult as devices become smaller and substrate real estate becomes more constrained. Component attachment is typically accomplished by dispensing glue onto the substrate, and using a pick-and-place robot to lift up a component and set it down at a prescribed location on the substrate. To attach a hollow component such as a camera lens assembly, glue is dispensed in line patterns and the component is attached in such a way that the perimeter of the component coincides with the glue line. One problem that arises in mounting components is that the epoxy used to bond the components to the substrate can bleed onto neighboring contact pads or bond pads, thereby interrupting electrical connections or interfering with next process steps. Even if the epoxy is dispensed in narrow glue lines, when the component is pressed into the epoxy, the foot of the component displaces some of the glue, which then flows onto the neighboring contact pads. One way to decrease the amount of glue displaced is to narrow the glue line further. However, switching to a new epoxy formula may be necessary in order to achieve a comparable joint with less glue volume. Qualifying a new type of epoxy for introduction into a manufacturing process can be a very complex, time-consuming, and costly process. Another method of bonding involves dispensing epoxy onto the substrate in a narrow glue line that corresponds to only a partial perimeter of the component wall. The rest of the perimeter will simply not receive any glue. When the component is then aligned with the narrow glue line, applying pressure along the partial perimeter that has glue underneath it will displace some of the glue, but the remaining component perimeter will just sit on top of the substrate. After curing the epoxy, a rigid joint will form in the usual way along the partial perimeter. Bonding using such a method can solve the glue displacement problem by designing the substrate layout so that particularly vulnerable areas of the substrate are near the unglued portion of the perimeter.

However, there are potential drawbacks to such a method of partial gluing. First, the unglued portion of the component may not be completely stationary and it may rub against the substrate. In some applications such friction may not matter. In other applications, such friction may generate an unacceptable number of particles, or the component may not be bonded tightly enough. In addition, in the case of camera components, light leakage at the location of the unglued portion may affect the optical performance of the camera. Furthermore, debris may pass underneath the unglued portion of the mount wall and collect underneath the component. In addition, a broken glue line is more likely to separate from the substrate than is a continuous glue line.

BRIEF SUMMARY

Because of the drawbacks of altering the glue line or the gluing process, alternative practical solutions to the problem of glue displacement are of interest. A method of preventing glue displacement near certain features on a substrate by selective bonding of a component entails modifying a mount wall of the component, along its perimeter. For example, in the case of a camera component lens assembly being mounted to a substrate, a section of the perimeter of the mount wall of the camera may be shortened so that the foot of the mount wall contacts the epoxy without causing substantial displacement. As the epoxy is cured, it hardens and holds the shortened foot of the mount wall in a stationary position, while providing a partial bond. Meanwhile the rest of the mount wall that is not located near contact pads on the substrate has a tall foot that extends all the way to the surface of the substrate and is bonded in the usual way. One advantage of this method is that, by modifying the component, it is not necessary to modify either the chemistry of the epoxy or the epoxy dispense operation. Also, because the shortened foot is bonded at least somewhat to the epoxy, the mount is held in place along its entire perimeter, with a greater bonding force along 50-75% of the perimeter that corresponds to the tall foot of the mount wall, and a smaller bonding force along 25-50% of the perimeter that corresponds to the shortened foot of the mount wall.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of microelectronics module assembly comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Specific embodiments are described herein with reference to techniques that have been used to bond devices such as camera lens assemblies to substrates; however, the present disclosure and the reference to certain materials, dimensions, and the details and ordering of processing steps are exemplary and are not limited to those shown.

Figure 1A:
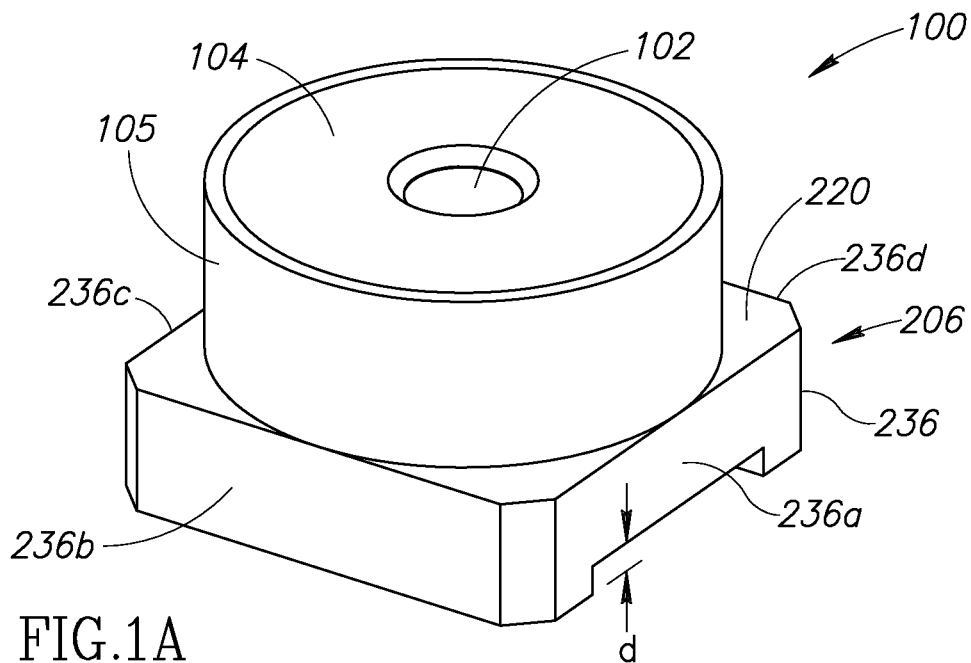
FIG. 1A is a pictorial perspective view of a miniature lens assembly, according to the present disclosure, to be bonded to a substrate to form a camera module.
Figure 1B:
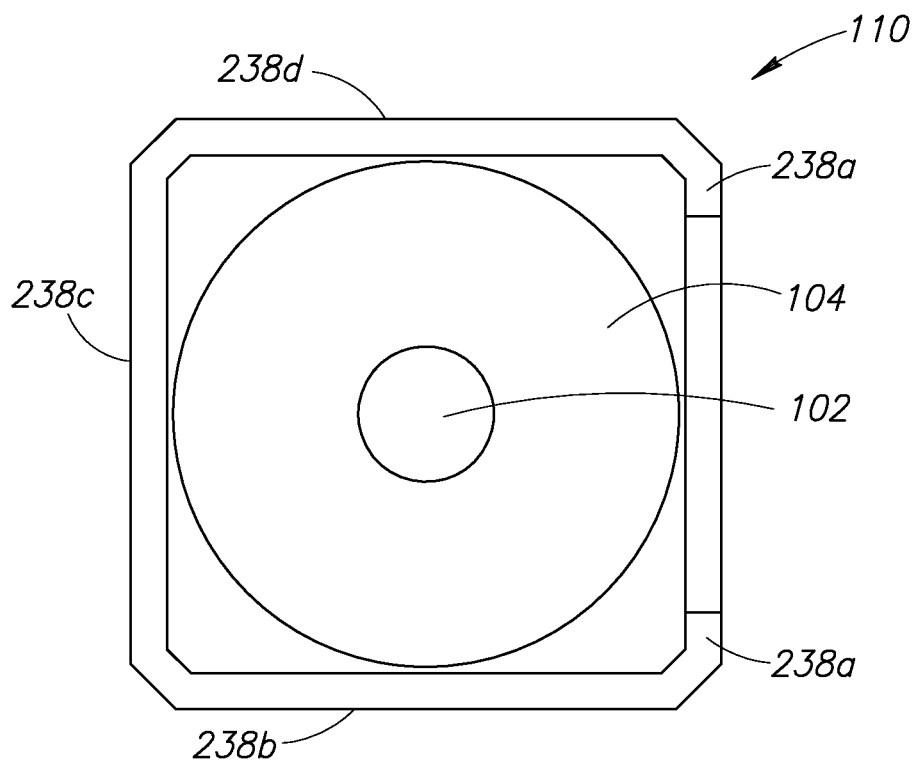
FIG. 1B is a bottom plan view of the lens assembly shown in FIG. 1A.

FIGS. 1A and 1B show two views of an exemplary component, a miniature lens assembly 100, for incorporation into a camera module, which in turn is incorporated into a mobile electronic device such as a smart phone as disclosed herein. FIG. 1A shows a top view of the lens assembly 100, and FIG. 1B shows the underside 110 of the lens assembly 100, which is configured to be attached to a substrate. In the embodiment described herein, the lens assembly 100 together with the substrate and other components attached to the substrate, form a camera module. Such other components of the camera module can include, for example, an image sensor die, capacitors, resistors, and driver chips. In general, the substrate is any initial board upon to which a device mount supporting the electronic component is attached. In some embodiments, the substrate is an interposer board. In one embodiment, the substrate is a laminate substrate. In other embodiments, an electronic component may be mounted directly onto a printed circuit board (PCB), so that the substrate is the PCB.

The exemplary lens assembly 100 includes an optical lens element 102, a lens barrel 104, and a lens mount 105. The optical lens element 102 can be made of glass or plastic, for example. The lens barrel 104 surrounds the optical lens element 102. The lens mount 105 houses mechanical parts that facilitate movement of the lens element 102 to allow adjustment of the focal length of the lens, in response to control signals received via circuitry embedded in the substrate. The lens mount 105 can be made of plastic, for example, and may be as thick as 500 microns.

The lens assembly 100 is attached to a pedestal in the form of a customized device mount 206. Alternatively, the lens assembly 100 may include the customized device mount 206. In the embodiments shown herein, the customized device mount 206 is used to mount the lens assembly 100. However, in another embodiment, such a customized device mount may be used to mount to a substrate a lighting device such as a flash assembly, in proximity to the lens assembly 100. In further embodiments, customized device mounts similar to the example described herein may be used to mount to a substrate other types of components such as, for example, a microphone assembly or a speaker assembly. The customized device mount 206 is desirably made of metal, but may be made of other materials such as ceramic or plastic. The customized device mount 206 includes a central mount portion 220 and a perimeter wall 236, the central mount portion being attached, or removably attached, to a device, e.g., the base of the camera lens mount 105. Alternatively, the customized device mount 206 for a camera can be formed together with the lens mount 105 as one integral unit. In the embodiment shown, the customized device mount 206 has a square perimeter wall 236, including four mount walls 236a, 306b, 236c, 236d, as indicated in FIG. 1A. In other examples, the customized device mount 206 has a different shape, e.g., the customized device mount 206 can have the shape of a closed polygon such as circular, rectangular, triangular or the like, in which case the number of mount walls may vary accordingly. Alternatively, the customized device mount 206 can have an open shape such as, for example, a U-shape or a semi-circle. The thickness of the perimeter wall 236 is in the range of about 200-300 µm.

Each mount wall has a corresponding foot e.g., 238a, 238b, 238c, 238d, shown in FIG. 1B, the foot being the lowest portion of the mount wall that might contact the adhesive once the lens assembly 100 is attached to the substrate. The customized device mount 206 is fashioned with a customized section of the perimeter wall 236, e.g., a mount wall section 236a that features a short foot 238a, while each one of the other mount wall sections, has a standard tall foot 238b, 238c, and 238d. The foot 238a is shorter than the other feet by a distance d. The shortened wall section 236a can be an entire wall, any portion of the wall, or alternating sections at different locations around the periphery of the module being mounted. In the example shown, the shortened wall section 236a occupies approximately 80% of one section of the wall. In alternative embodiments, it may also be present on each of the four sides or, if the wall is circular, at various locations around the perimeter of the wall. It may also be in two distinct sections even along the same wall region. For example, the shortened wall section 236a can be selectively positioned only at those locations in which a closely adjacent circuit is present and therefore be at a plurality of distinct, spaced locations around the periphery of the customized device mount 206.

Figure 2A:
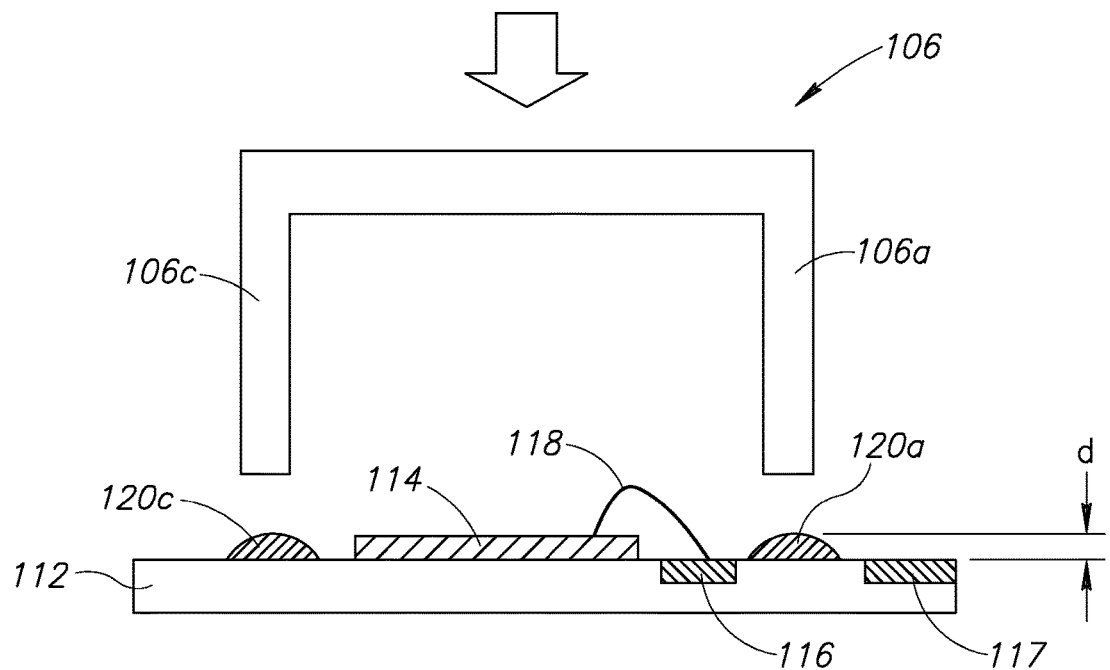
FIG. 2A is a side view of two conventional device mount walls during alignment to a substrate, according to a prior art structure and method.
Figure 2B:
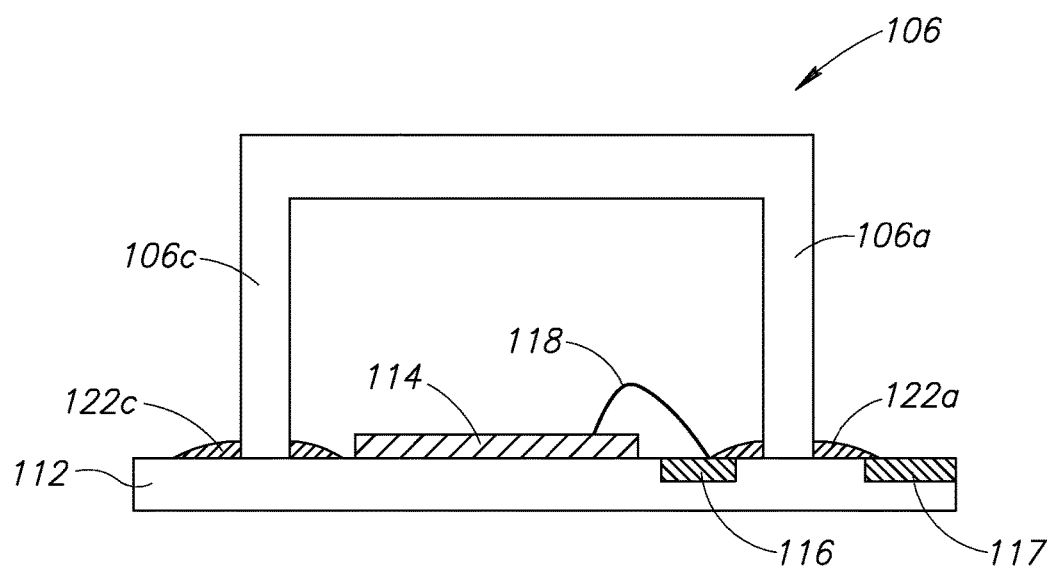
FIG. 2B is a side view of the conventional device mount walls shown in FIG. 2A, following attachment to the substrate, according to a prior art structure and method.

FIGS. 2A and 2B show a standard technique for attaching a conventional device mount 106 to a substrate 112, according to the prior art. Before introducing the lens mount 106, there may be other items already on or mounted to the surface of the substrate 112 such as, for example, an integrated circuit die 114, and bond wires 118 coupled to bond pads 116. Bond pads 116 are part of the substrate 112. According to a typical mounting procedure, an epoxy is dispensed onto the top surface of the substrate 112 to form a continuous narrow glue line 120 having narrow glue line segments 120a-120d. Although only two narrow glue line segments are shown in profile in FIG. 2A. A top plan view would show four or more narrow glue line segments 120a-120d, corresponding to each location where the conventional device mount 106 contacts the substrate 112.

Next, the conventional device mount 106 is aligned with the narrow glue line 120, and lowered toward the substrate so that the mount wall 106a contacts the glue line segment 120a, the mount wall 106c contacts the glue line segment 120c, and so forth. As the mount walls are brought into contact with the substrate 112, as shown in FIG. 2B, the narrow glue line segments 120a-120d spread out to form wide glue line segments 122a-122d of which two wide glue line segments, 122a, 122c, are shown in profile in FIG. 2B. Depending on the layout of devices on the substrate, some of the wide glue line segments, for example, 122a, may bleed glue onto neighboring parts, such as bond pads 116 or possibly other electrical components. The bond pads 116 typically have dimensions of about 0.2 mm-0.3 mm. The presence of epoxy on the bond pads 116 could degrade electrical contact between the bond pad 116 and a bond wire 118. Additionally or alternatively, the presence of epoxy on the contact pad 117 could interfere with formation of an electrical contact between the contact pad 117 and contact pins of the lens assembly 100. Such electrical contacts are made with conductive glue or solder in subsequent processing steps. As electronic components shrink with advancing technology, more and more components are crowded onto the substrate 112, thus increasing the risk that the wide glue line segments 122a-122d will cause problems.

Figure 3:
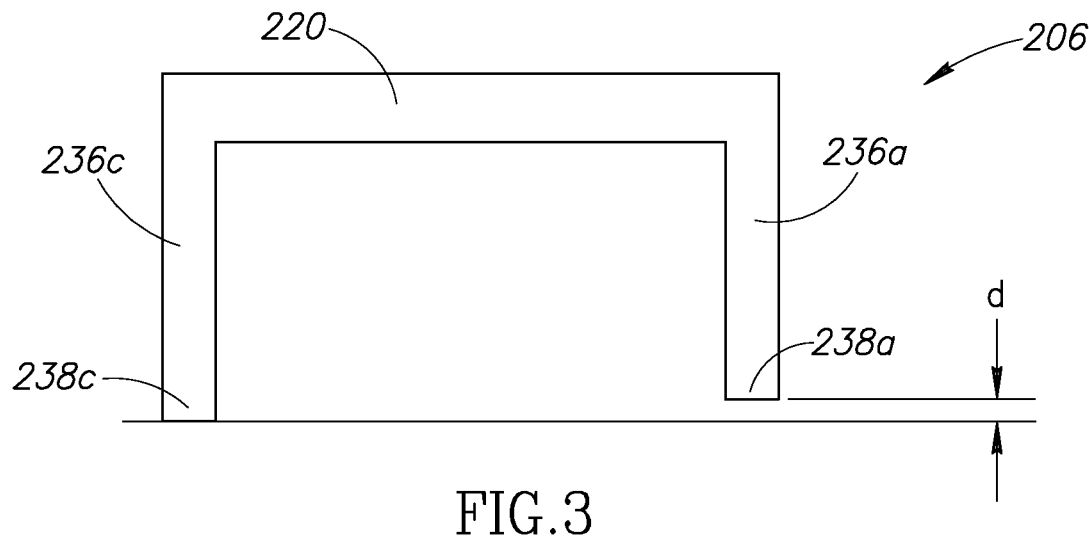
FIG. 3 is a side view of a customized device mount having an uneven perimeter wall, as described herein.

FIG. 3 shows a cross-section view of the customized device mount 206 shown in FIGS. 1A and 1B, according to one embodiment. Two of the mount walls, 236a, 236c, are shown in profile in FIG. 3. The length difference d between the tall foot 238c and the short foot 238a is selected based on the height of the narrow glue line segments 120a-120d. Typically, the narrow glue line 120 has a width within the range of about 300-500 µm and a height within the range of about 50-150 µm. The shape and dimensions of the glue line segment 120a, including the height d, are controlled by the choice of adhesive material and by adjusting the dispensing process. Furthermore, the dimensions of the narrow glue line 120 can be selected to accommodate neighboring features, e.g., taking into account the distance to the nearest bond pads 116, for example, as well as the sizes of the bond pads 116. However, changing the adhesive material or the bonding process to avoid glue displacement can be an undesirable approach because of manufacturing constraints and the high cost of qualifying and implementing process changes involving chemicals such as adhesives.

Use of the customized device mount 206 avoids modifying the adhesive process, and instead changes the component design, which is an easier change to implement. Hence, the manufacture of the customized device mount 206 accommodated a set of given dimensions of the glue line segment 120a. In particular, the customized device mount 206 is dimensioned so that the glue line segment 120a fills the space between the upper surface of the substrate 112 and the lower surface of the short foot 238a, without deforming significantly when the short foot 238a makes contact with the upper surface of the glue line segment 120a.

In one embodiment, a square or rectangular customized device mount 206 is fashioned with two shortened mount walls, e.g., 236a, 236b. In another embodiment, the customized device mount 206 has a circular perimeter wall 236 wherein a standard section of the perimeter wall 236 has a tall foot 238c and a modified section of the perimeter wall has a short foot 238a. Generally, for any device mount shape, the customized section of the perimeter wall 236 having the short foot desirably encompasses no more than 50% of the total perimeter of the mount. As explained above, the location of the short foot 238a can be selected based on the location of components which will be on the substrate. Generally, the short foot 238a will be present at those locations on the substrate which have a closely adjacent electrical component. The short foot 238a may extend along the entire length of one of the side wall sections, or alternatively may be at various locations spaced apart from each other on two or more of the walls or at various wall sections, depending on the shape and structure of the device mount.

Figure 4:
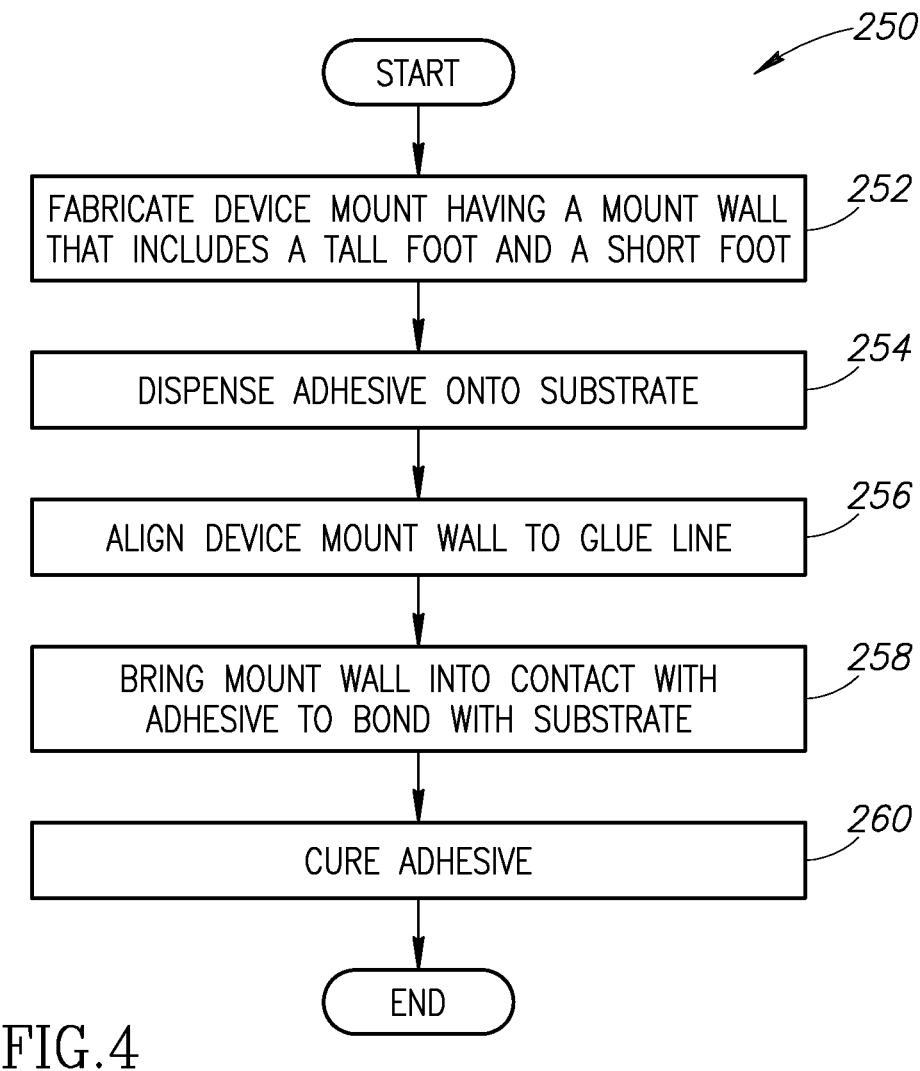
FIG. 4 is a flow diagram showing generalized steps in a method of selectively bonding a component to a substrate, using the customized device mount as described herein.

FIG. 4 shows a sequence of steps in an exemplary method 250 of selectively attaching a component, e.g., the lens assembly 100, to the substrate 112 using the customized device mount 206. The method 250 is not limited to bonding a camera lens to a substrate. The method 250 generally can be applied to bonding any type of component to a substrate using an adhesive that has a liquid or semi-liquid consistency (e.g., a gel), such as an epoxy. Steps in the method 250 are illustrated in FIGS. 5A and 5B.

At 252, the customized device mount 206, as described above, is fabricated so as to have one or more mount walls in which the short foot 238a differs from the tall foot 238c by the selected height d, which is based on a typical glue line height. For example, the selected height d may be chosen as 100 µm. To further enhance adhesion of the mount wall to the epoxy, lower surfaces of the mount wall can be roughened to increase the bonding surface area.

At 254, a viscous adhesive, e.g., an epoxy, is dispensed onto the top surface of the substrate 112 to form the continuous narrow glue line 120 having a height target of 100 µm, to which the customized device mount 206 has been fabricated to match.

Figure 5A:
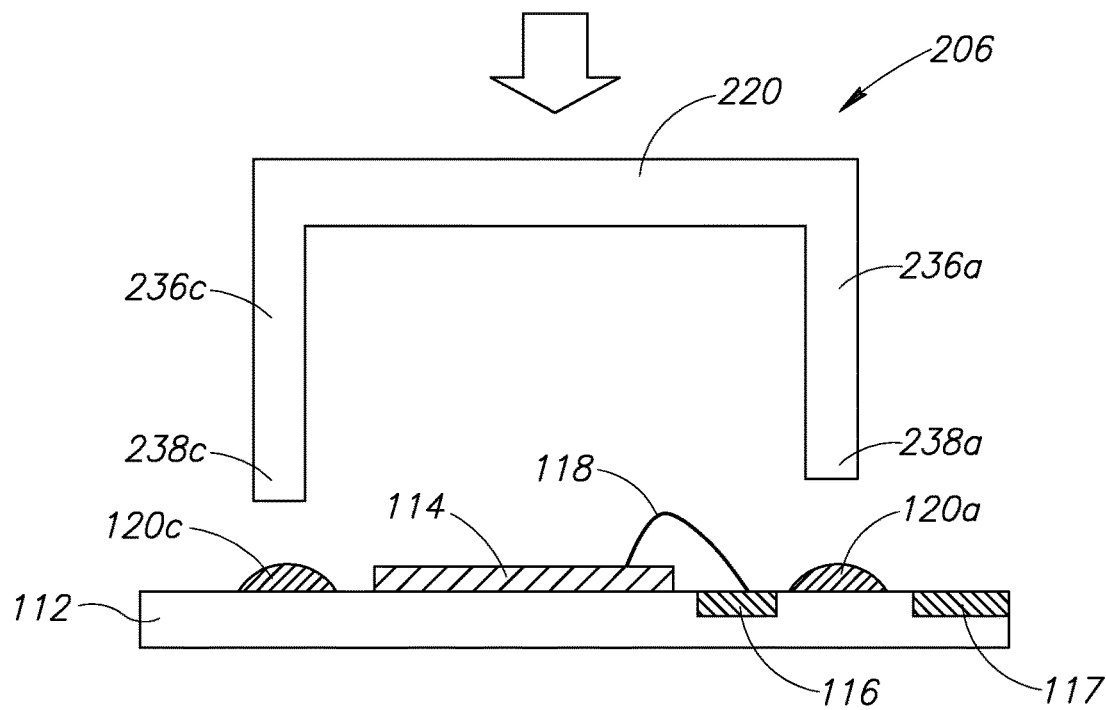
FIG. 5A is a side view of the customized device mount during alignment of a component to a substrate, according to a bonding method described herein.
Figure 5B:
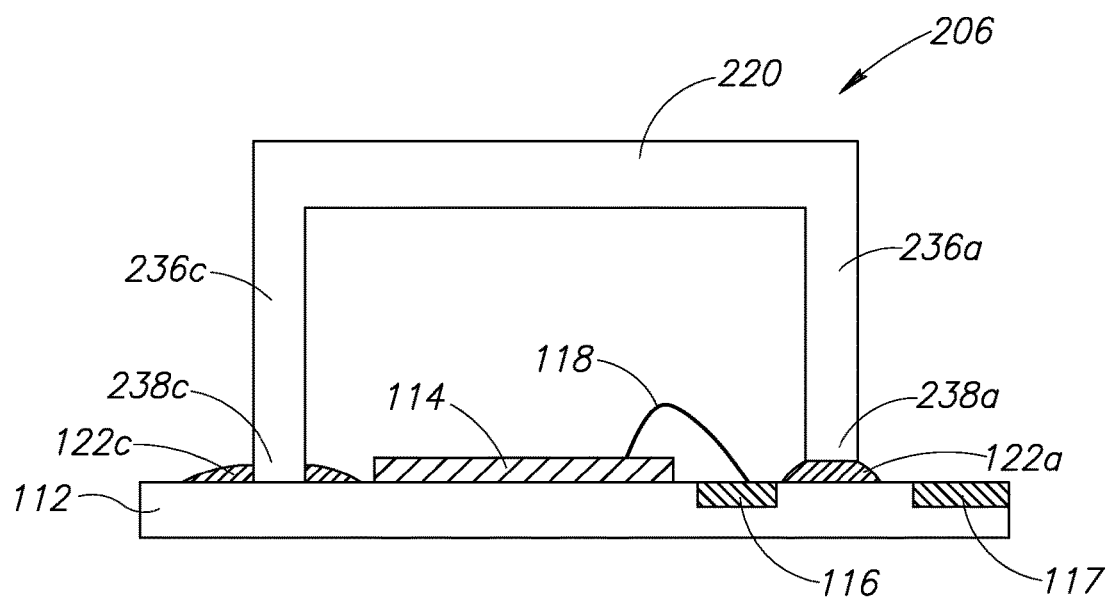
FIG. 5B is a side view of the customized device mount shown in FIG. 5A, following attachment to the substrate, according to a bonding method described herein.

As shown in FIG. 5A, at 256, the standard section of the perimeter wall 236c, having the tall foot 238c, is aligned to the narrow glue line segment 120c, while the customized section of the perimeter wall 236a, having the short foot 238a, is aligned to the top surface of the narrow glue line segment 120a. At 258, the customized device mount 206 is lowered toward the substrate so that the mount walls are brought into contact with corresponding glue line segments.

FIG. 5B shows the customized device mount 206 after being placed on the substrate 112 in contact with the narrow glue line 120. In response to pressure from the tall foot 238c, the narrow glue line segment 120c is displaced and spreads out in the usual way to form the wide glue line segment 122c that is about 25% wider than the original narrow glue line segment 120c. However, when the mount wall 236a having the short foot 238a is placed on the substrate 112, the short foot 238a contacts only the top surface of the narrow glue line segment 120a without exerting significant pressure, and therefore does not displace the epoxy. Instead, the narrow glue line segment 120a substantially maintains its original shape without spreading laterally. Consequently, the bond pads 116 remain clean so that electrical connections between the bond wires 118 and the bond pads 116 are not compromised. At the contact point where the short foot 238a and the long foot 236a touch the epoxy, capillary action tends to wick some of the glue upward onto the sides of the mount walls, which helps to ensure that the bond pads 116 remain unobstructed.

At 260, the epoxy is cured by an acceptable method, such as UV light, IR light, or thermal processing at an ambient temperature within the range of about 50-150 C for a time interval within the range of about 0.1-3.0 hours, or the like. The epoxy can be cured either by baking the entire substrate 112 together with the mount in place, or by localized heating of the glue lines. Curing causes the epoxy to harden and form at least a semi-rigid joint between the short foot 238a and the substrate 112, and a substantially rigid joint between the tall foot 238c and the substrate 112.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An assembly comprising:
   an optical lens element;
   a lens barrel surrounding the lens element;
   a lens mount surrounding the lens barrel;
   a device mount supportably attached to the lens mount, the device mount having a mount wall that forms an outer perimeter surface of the device mount, the mount wall including a tall foot and a short foot, there being a selected length difference between the tall foot and the short foot such that portions of the outer perimeter surface of the device mount are uneven with respect to each other;
   a substrate; and
   a continuous glue line forming a closed shape around a perimeter of the device mount that couples the device mount to the substrate, the continuous glue line extending between the tall foot and the substrate and between the short foot and the substrate.

2. The assembly of claim 1 wherein the customized mount wall has a rectangular perimeter, the tall foot encompassing three sides of the rectangular perimeter and the short foot encompassing one side of the rectangular perimeter.

3. The assembly of claim 1 wherein the customized mount wall has a rectangular perimeter, a first pair of parallel sides of the rectangular perimeter each having a tall foot, and a second pair of parallel sides of the rectangular perimeter each having a short foot.

4. The assembly of claim 1 wherein the customized mount wall has a circular perimeter of which a selected arc, having an associated radial angle less than 180 degrees, has a short foot, and the remaining circular perimeter has a tall foot.

5. The assembly of claim 1 wherein the short foot contacts a glue line having a selected height within a range of about 50-150 μm, without substantially displacing the glue line.

6. A device mount, comprising:
   a central mount portion attachable to a device; and
   a perimeter wall extending from the central mount portion, the perimeter wall having an uneven footprint, a first section of the perimeter wall having a tall foot, and a second section of the perimeter wall having a short foot, there being a selected length difference distinguishing the short foot from the tall foot such that portions of the outer surface of the device mount are uneven with respect to each other, the short foot and the tall foot of the perimeter wall forming an outer surface of the device mount; and
   a continuous glue line along bottom surfaces of the tall foot and short foot and forming a closed shape around a perimeter of the device mount.

7. The device mount of claim 6 wherein a length of the customized section of the perimeter wall having the short foot is no greater than 50% of the total perimeter wall.

8. An apparatus, comprising
   a substrate;
   a continuous glue line on the substrate forming a closed shape, the glue line having a glue line height above a top surface of the substrate, the glue line being hardened and having a stationary position relative to the substrate; and
   a mount adhered to the substrate by the glue line at an outer perimeter of the mount, the outer perimeter of the mount including a mount wall having a tall foot and a short foot, a lower surface of the short foot contacting a top surface of the glue line, while the tall foot is in contact with the glue line and the top surface of the substrate, the tall foot and the short foot of the mount wall forming an outer perimeter surface of the mount.

9. The apparatus of claim 8 wherein the substrate is a printed circuit board (PCB).

10. The apparatus of claim 8 wherein the mount is attached to an electronic device.

11. The apparatus of claim 10 wherein the mount forms a pedestal supporting the electronic device.

12. The apparatus of claim 10 wherein the electronic device is a miniature optical lens assembly.

13. The apparatus of claim 10 wherein the mount is part of the optical lens assembly.

14. The apparatus of claim 8 wherein a length difference between the tall foot and the short foot substantially matches the glue line height.

15. The apparatus of claim 8 wherein the hardened glue line forms at least a semi-rigid joint between the short foot and the substrate.

16. The apparatus of claim 8 wherein a portion of the glue line in contact with the tall foot spreads to form a wide glue line segment that is at least 25% wider than a narrow glue line segment in contact with the short foot.

17. The apparatus of claim 8 wherein a lower surface of the mount wall is roughened to enhance adhesion to the substrate.

18. The apparatus of claim 8 wherein the glue line height is within a range of about 50-150 μm.

19. The device of claim 8 wherein the glue line width is within a range of about 300-500 μm.

20. The apparatus of claim 8 wherein the substrate is a laminate substrate.

21. The apparatus of claim 8 wherein the glue line is made of an epoxy type glue.

* * * * *